US006747787B2

(12) United States Patent
Furukawa et al.

(10) Patent No.: US 6,747,787 B2
(45) Date of Patent: Jun. 8, 2004

(54) OPTICALLY FUNCTIONAL DEVICE, SINGLE CRYSTAL SUBSTRATE FOR THE DEVICE AND METHOD FOR ITS USE

(75) Inventors: Yasunori Furukawa, Ibaraki (JP); Kenji Kitamura, Ibaraki (JP); Shunji Takekawa, Ibaraki (JP); Masaru Nakamura, Ibaraki (JP)

(73) Assignee: National Institute for Research in Inorganic Materials, Tsukuba (JP)

( * ) Notice: Subject to any disclaimer, the term of this patent is extended or adjusted under 35 U.S.C. 154(b) by 145 days.

(21) Appl. No.: 09/797,596

(22) Filed: Mar. 5, 2001

(65) Prior Publication Data
US 2002/0024716 A1 Feb. 28, 2002

(30) Foreign Application Priority Data

Aug. 25, 2000 (JP) ........................................ 2000-255253

(51) Int. Cl.$^7$ ............................................... G02F 1/355
(52) U.S. Cl. ...................................................... 359/326
(58) Field of Search .................................. 359/326–332

(56) References Cited

U.S. PATENT DOCUMENTS

| 5,291,576 A | * | 3/1994 | Nakamura | 385/142 |
| 5,315,432 A | * | 5/1994 | Ohno | 359/326 |
| 5,371,812 A | * | 12/1994 | Nakamura | 385/9 |
| 6,195,197 B1 | * | 2/2001 | Gopalan et al. | 359/326 |
| 6,402,834 B1 | * | 6/2002 | Nagai et al. | 117/13 |

OTHER PUBLICATIONS

A. Grisard et al.; "Low electric field periodic poling of thick stoichiometric lithium niobate"; Electronics Letters; Jun. 8, 2000, vol. 36, No. 12; pp. 1043–1044.

V. Bermudez et al.; "Role of stoichiometric point defect in electric–field–pling lithium niobate"; Materials Science & Processing: vol. 70. No. 5: May 2000; pp. 591–594.

Y. Furukawa et al.; "Stiochiometric Mg:LiNbO3 as an effective material for nonlinear optics"; Optics Letter; vol. 23, No. 24; Dec. 15, 1998; pp. 1892–1894.

M. Yamada et al; "Electric–field induced cylindrical lens, switching and deflection devices composed of the Inverted domains in LINbO3 crystals": Appl. Phys. Lett.; vol. 69, No. 24; Dec. 9, 1998; pp. 3659–3661.

K. Kitamura et al.; "Stoichlometric LINbO3 single crystal growth by double crucible Czochralski method using automatic powder sypply system"; Journal of Crystal Growth; vol. 116; Feb. 1, 1992; pp. 327–332.

M. Fujimura et al; "Blue Light Generation in LiNbO3 Waveguide SHG Device with First Order Domain–Inverted Grating Formed by EB Scanning"; Electronics Letters; vol. 28, No. 20; Sep. 24, 1992; pp. 1868–1869.

* cited by examiner

Primary Examiner—John D. Lee
(74) Attorney, Agent, or Firm—Oblon, Spivak, McClelland, Maier & Neustadt, P.C.

(57) ABSTRACT

An optically functional device comprising a ferroelectric single crystal substrate and polarization-inverted structures formed at portions of the substrate at a temperature of not higher than the Curie temperature by an electron beam scanning irradiation method or a voltage application method and designed to control light passed through the polarization-inverted portions, wherein a LiNbO$_3$ crystal having a molar ratio of Li/Nb within a range of from 0.95 to 1.01, is used as the substrate, so that the propagation loss of light passed through the polarization-inverted portions immediately after formation of the polarization-inverted structures, is not more than 2%.

5 Claims, 5 Drawing Sheets

OPTICALLY FUNCTIONAL DEVICE, SINGLE CRYSTAL SUBSTRATE FOR THE DEVICE AND METHOD FOR ITS USE

BACKGROUND OF THE INVENTION

1. Field of the Invention

The present invention relates to an optically functional device to control light by utilizing polarization-inverted structures in a LiNbO$_3$ single crystal substrate, which is useful in various fields of e.g. optical information processing, optical processing technology, optical communication technology and optical measurement using a laser beam, a single crystal substrate for such an optically functional device, and a method of using such a single crystal substrate for the optically functional device.

2. Discussion of Background

A lithium niobate (LiNbO$_3$) single crystal (hereinafter sometimes referred to simply as "LN") known as a typical ferroelectric single crystal, is used mainly as a substrate for a surface acoustic wave device. With respect to this crystal, a single crystal having a large diameter and a high compositional homogeneity can be supplied at a relatively low cost. Further, this crystal is transparent within a wide wavelength range of from visible region to infrared, and it is possible to invert the ferroelectric polarization even at room temperature by applying a high electric field at a level of a few tens kV/mm. Accordingly, it has attracted attention in recent years also as a substrate for various optically functional devices such as non-linear optical devices or electro-optical devices, using the polarization-inverted structures.

Particularly, in recent years, it is expected to have second harmonic wave generating (SHG) devices of waveguide type developed to convert a semiconductor laser having a near infrared wavelength to a blue light having a half wavelength by a non-linear effect. Among them, a frequency conversion device is most thoroughly studied which employs an element of a structure having the polarization of an inorganic ferroelectric single crystal such as LN periodically inverted, as a light source for high density recording/read out of optical disks. Such a frequency conversion device is based on a quasi phase matching (QPM) system, which is a system to carry out phase matching by compensating the difference between propagation constants of the fundamental wave and the higher harmonic wave with the periodic structures.

This system has many excellent characteristics such that high conversion efficiency can be obtained, collimation or diffraction limit condensation of the output light is easy, and useful materials or wavelengths are not particularly limited. As the periodic structures for QPM, structures having the sign of the SHG coefficient (the d$_{33}$ coefficient) periodically inverted, are most effective to obtain high efficiency, and with a ferroelectric crystal, positive or negative of the d coefficient corresponds to the polarity of the ferroelectric polarization, whereby the technology to have the ferroelectric polarization domains periodically inverted, becomes important.

As a device employing this system, a parametric oscillation wave-shifting device by means of the QPM system, has been reported, wherein periodically inverted structures are formed by applying an electric field of about 21 kV/mm to a LN single crystal, as disclosed in a literature (L. E. Myers et al., Optics Letters, 21, p591, 1996). Further, a SHG laser has been reported wherein polarization-inverted structures are formed in a periodic cycle of 4.75 μm in a LN single crystal having MgO added, by means of a corona discharge method, as disclosed in a literature (A. Harada et al., Optics Letters, 22, p805, 1997).

Further, with respect to an optical device utilizing an electro-optical effect, for example, according to a literature (M. Yamada et al., Appl. Phys. Lett., 69, p3659, 1996), attention has been drawn to a cylindrical lens, a beam scanner, a switch, and an optical device to form polarization-inverted structures of a lens or prism shape in a LN single crystal as a ferroelectric crystal by applying a high electric field to the crystal and to polarize a laser beam passed therethrough by utilizing the electro-optical effect, as new optical devices. The LN single crystal is also considered to be promising as a substrate material.

With respect to a frequency conversion device or an electro-optical device utilizing the polarization-inverted structures of a ferroelectric LN single crystal, so far reported, in each case, a commercially available LN single crystal having a congruent composition with no additive or with MgO added, has been employed as the substrate crystal, because the LN single crystal so far available has been limited to a crystal having a congruent composition grown by a Czochralski method which is capable of growing a crystal having a large diameter inexpensively, from the industrial viewpoint. With respect to the LN crystal, it is well known from the correlation diagram of temperature/compositional ratios (phase diagram) that the stoichiometric composition and the congruent composition do not agree with each other.

Only the congruent composition is a composition whereby the composition of the melt and the composition of the crystal will agree, and a crystal having a uniform composition can be grown over the entire crystal. Accordingly, the composition of the LN single crystal which is presently produced and used for various applications, is a congruent composition having a molar fraction of Li$_2$O/(Nb$_2$O$_5$+Li$_2$O) of about 0.485 (the molar ratio of Li/Nb being about 0.94). Accordingly, in the conventional LN single crystal having a congruent composition, the Nb component is excessive, whereby Nb ions as much as a few percent are substituted for Li ions (anti-site defects), and Li ion sites also have a few percent of vacancy defects. The influence of these defects may not be serious for an application to a surface acoustic wave device, but can not be neglected for an application to an optical device. Accordingly, it has been desired to develop a crystal having a composition close to the stoichiometric composition and having non-stoichiometric defects reduced, as a substrate to be used for optically functional devices.

As is apparent from the phase diagram, for example, in the case of a LN single crystal, a crystal having a composition close to the stoichiometric composition can be precipitated from a melt having a composition having a Li concentration higher than the stoichiometric composition. However, when it is attempted to grow a crystal having the stoichiometric composition by the Czochralski method which has been used as a means to produce a LN crystal having a large diameter in a large amount on an industrial scale, the excessive Li component will remain in a crucible along with the precipitation of the crystal, and the compositional ratio of Li/Nb in the melt will gradually change, whereby the compositional ratio in the melt will reach the eutectic point soon after the initiation of growing. Accordingly, the solidification ratio of the crystal is restricted to a level as low as about 10%, and the quality of the precipitated crystal has been so poor that it can not be used for an optically functional device.

The present inventors have previously invented a lithium tantalate single crystal close to the stoichiometric composition having a molar fraction of $Li_2O/(Nb_2O_5+Li_2O)$ of from 0.495 to 0.50 (the molar ratio of Li/Nb being from about 0.98 to 1.00) and having the non-stoichiometric defect concentration of the congruent composition substantially reduced, as a novel substance different from the conventional commercially available LN crystal having a congruent composition, and have filed a Patent Application (JP-A-10-45497). Further, they have reported about this novel crystal in a literature as follows. Namely, as a means to develop a crystal of high quality by reducing such non-stoichiometric defects, the present inventors have proposed a method of growing a crystal while continuously supplying the material (hereinafter referred to simply as the double crucible method of continuously supplying the material), for example, in a literature (K. Kitamura et al., Journal of Crystal Growth, Vol. 116, 1992, p327–332, or K. Kitamura et al., Applied Physics, Vol. 65, No. 9, 1996, p931–935).

Specifically, for example, in growing a LN single crystal close to the stoichiometric composition, the molar fraction of $Li_2O/(Nb_2O_5+Li_2O)$ in the melt for growing was adjusted to be from 0.56 to 0.60 i.e. the Li component being excessive, and the crucible was made to have a double structure, whereby it was possible to pull up from the inner crucible, a LN crystal close to the stoichiometric composition having a molar fraction of $Li_2O/(Nb_2O_5+Li_2O)$ of from 0.498 to 0.502 (the molar ratio of Ni/Nb being from about 0.99 to 1.01). The weight of the crystal being pulled up was measured at all times to obtain the growth rate, and a starting material powder having the same stoichiometric composition as the crystal, was continuously supplied between the outer and inner crucibles at that rate. By employing this method, it was possible to grow a long crystal, and a crystal solidification ratio of 100% based on the amount of the material supplied, was realized.

Further, in a recent literature (K. Kitamura et al., Journal of Crystal Growth, Vol. 25, No. 3, 1998, pA4), the present inventors have reported that with the above-mentioned LN single crystal close to the stoichiometric composition (the molar ratio of Ni/Nb being from 0.98 to 1.0) with no additive, the applied electric field required for the polarization inversion is at a level of ⅕ of the electric field heretofore applied. Namely, they have reported that the presence of a few percent of non-stoichiometric defects (anti-site defects or vacancy defects) in the conventional crystal having a congruent composition, possibly increases the applied voltage required to form the periodic polarization structures or the optical characteristics which the LN crystal essentially has.

Further, in a recent literature (Y. Furukawa et al., Journal of Crystal Growth, Vol. 211, 2000, p230–236), the present inventors have reported that with a crystal having a composition close to the stoichiometric composition, the optical damage resistance can sufficiently be improved by an addition of e.g. Mg in an amount as small as about 1 mol %, which used to be required in an amount of at least 5 mol % to improve the optical damage resistance of the conventional crystal having a congruent composition. In such a case, Mg is substituted also at Li sites, and as the amount of Mg added, increases, the Li/Nb molar ratio becomes small as compared with the crystal having no additive, and the Li/Nb molar ratio of the obtained crystal is from 0.95 to 1.0. Although the difference in the molar fraction is small between LN of stoichiometric composition and LN of congruent composition, the crystal characteristics substantially differ as the composition becomes close to the stoichiometric composition. Particularly, the crystal having a Li/Nb molar ratio within a range of from 0.95 to 1.01, has optical characteristics substantially different from the conventional crystal having a congruent composition.

In order to form polarization-inverted structures on a substrate made of a ferroelectric single crystal and to realize an optically functional device utilizing the interaction between the electro-optical effect and the non-linear optical effect of light passed through the polarization-inverted portions, the most important technique is to prepare from a few to as many as several hundreds polarization-inverted structures of a few $\mu m$ to several tens $\mu m$ sizes uniformly and with high precision.

As a method for forming polarization inversion, an electron beam irradiation method or a voltage application method is well known and commonly used. Such an optically functional device is used by passing light through the polarization-inverted portions, and if there is an optical distortion or loss at the respective polarization-inverted boundaries, very substantial optical non-uniformity will result as the entire device, whereby a device with high efficiency can not be realized.

An optical distortion will be formed at the boundary of a polarization-inverted portion, whereby a change in the refractive index as large as $10^{-3}$ to $10^{-4}$ or larger will result. A serious problem has been pointed out in a literature (V. Gopalan et al., J. Appl. Phys., vol. 80, p.6104, 1996) such that the change in the refractive index brings about scattering of the laser beam passed therethrough, whereby the operation of the device will depart from the ideal condition, and the device efficiency will decrease.

It is reported, for example, in the above-mentioned literature (L. E. Myers et al., Optics Letters, 21, p591, 1996) that it is necessary to relax the optical distortion by heating the crystal at 120° C. for one hour after forming polarization-inverted structures by applying an electric field of about 21 kV/mm to the LN single crystal.

Further, in the above-mentioned literature, (M. Yamada et al., Appl. Phys. Lett., 69, p3659, 1996), it is reported that heat treatment is necessary after formation of polarization inversion by application of an electric field, also for an optical device having polarization-inverted structures of a lens or prism shape formed in a crystal by applying a high voltage to a LN single crystal as a ferroelectric crystal. It is reported that in this case, it is essential to heat the crystal substrate at 500° C. in atmospheric air and to carry out the heat treatment for 5 hours in order to remove optical distortions at the polarization-inverted portions.

In a conventional voltage application method, it is common that a LN single crystal having a congruent composition of z-cut is employed, and a periodic electrode is provided on one side of the crystal, and a uniform electrode is provided on the other side, and the sample is maintained at room temperature or heated to a level of about 200° C., and a pulse voltage is applied through the electrodes to invert the polarization of the portion immediately beneath the periodic electrode towards the z-axis direction. In the case of a conventional LN single crystal having a congruent composition, an applied voltage as high as at least 21 kV/mm is required for the polarization inversion.

Such a polarization inversion technique is to forcibly change the polarization i.e. the positions of Nb or Li ions in the crystal, at a temperature of not higher than the Curie temperature. With respect to the LN single crystal, it is known that the high voltage required for the polarization inversion may not necessarily be the direct cause for an optical distortion.

Namely, in the above-mentioned literature (A. Harada et al., Optics Letters, 22, p805, 1997), it is reported that with a LN single crystal having a congruent composition having 5 mol % of MgO added, the voltage required for the polarization inversion can be reduced to a level of about ⅕ of the voltage required for a usual congruent composition, but, even if this material is employed, heating at a temperature of 500° C. for three hours is required to remove an optical distortion in a case where a SHG laser having polarization-inverted structures formed in a periodic cycle of 4.75 μm in a LN single crystal having MgO added, by means of a corona discharge method, is to be prepared.

When the polarization-inverted boundaries of such a device having polarization-inverted structures formed in a substrate made of a conventional LN crystal having a congruent composition, were inspected by a polarization microscope, large optical distortions were observed at all of the polarization-inverted boundaries as shown in FIG. 1(a). Further, when the working laser beam was passed across the polarization-inverted portions, a very large propagation loss at a level of from a few percent to a few tens percent was observed. Formation of such optical distortions at the polarization-inverted boundaries, not only creates a problem of a large propagation loss but also makes it necessary to provide an extra heat treatment step for the preparation of an optically functional device to relax the optical distortions.

Further, another serious problem is that during the heat treatment to remove distortions, a pyroelectric effect is likely to form at polarization-inverted portions of a few μm size once formed by e.g. an electric field application method at portions of a single polarization substrate, whereby the crystal is likely to be broken, or the sizes or positions of the polarization-inverted portions are likely to change although very slightly. Such a change creates a serious problem for the preparation of a device with high efficiency and good reproducibility.

SUMMARY OF THE INVENTION

The present inventors have continuously studied the characteristics of the LN single crystals as ferroelectric single crystals in order to solve the above-mentioned problems of the prior art and have found that with a LN single crystal having a composition close to the stoichiometric composition, even when polarization inversion is formed, optical distortions or propagation losses of light at the polarization-inverted boundaries are very small, and by using this single crystal as the substrate, it is possible to prepare an optically functional device having polarization-inverted structures, which has excellent properties.

Namely, the present invention provides an optically functional device comprising a ferroelectric single crystal substrate and polarization-inverted structures formed at portions of the substrate at a temperature of not higher than the Curie temperature by an electron beam scanning irradiation method or a voltage application method and designed to control light passed through the polarization-inverted portions, wherein a LiNbO$_3$ crystal having a molar ratio of Li/Nb within a range of from 0.95 to 1.01, is used as the substrate, so that the propagation loss of light passed through the polarization-inverted portions immediately after formation of the polarization-inverted structures, is not more than 2%.

Further, the present invention provides an optically functional device comprising a ferroelectric single crystal substrate and polarization-inverted structures formed at portions of the substrate at a temperature of not higher than the Curie temperature by an electron beam scanning irradiation method or a voltage application method and designed to control light passed through the polarization-inverted portions, wherein a LiNbO$_3$ crystal having a molar ratio of Li/Nb within a range of from 0.95 to 1.01, is used as the substrate, so that the change in the refractive index of the polarization-inverted boundaries is not more than $1 \times 10^{-4}$ without a heating step to remove an optical distortion at the polarization-inverted boundaries due to the directional inversion of spontaneous polarization in the ferroelectric crystal.

Further, the ferroelectric single crystal substrate to be used in the above optically functional devices is made of a LiNbO$_3$ crystal having a molar ratio of Li/Ta within a range of from 0.95 to 1.00 and containing from 0.1 to 4.8 mol % of at least one element selected from the group consisting of Mg, Zn, Sc and In, as doped.

Still further, the present invention provides a single crystal substrate for an optically functional device to control light passed through a polarization-inverted portions, which is a ferroelectric single crystal substrate having polarization-inverted structures formed at a temperature of not higher than the Curie temperature by an electron beam scanning irradiation method or a voltage application method, wherein a LiNbO$_3$ crystal having a molar ratio of Li/Nb within a range of from 0.95 to 1.01, is used as the substrate, so that a propagation loss of light of not more than 2% and an optical distortion of not more than $1 \times 10^{-6}$ are obtainable without a heat treatment.

The present invention further provides a method for improving the frequency conversion efficiency of an optically functional device, wherein a LiNbO$_3$ crystal having a molar ratio of Li/Nb within a range of from 0.95 to 1.01, is used as a substrate for the optically functional device to carry out the frequency conversion of a laser entered into a single crystal having periodically inverted polarization structures by means of a nonlinear optical effect.

Furthermore, the present invention provides a method for improving the driving efficiency of an optically functional device, wherein a LiNbO$_3$ crystal having a molar ratio of Li/Nb within a range of from 0.95 to 1.01, is used as a substrate for the optically functional device to control polarization or condensing of a laser beam entered into a single crystal having polarization structures inverted in a prism or lens shape by means of an electro-optical effect.

DETAILED DESCRIPTION OF THE PREFERRED EMBODIMENTS

Figure 1A:
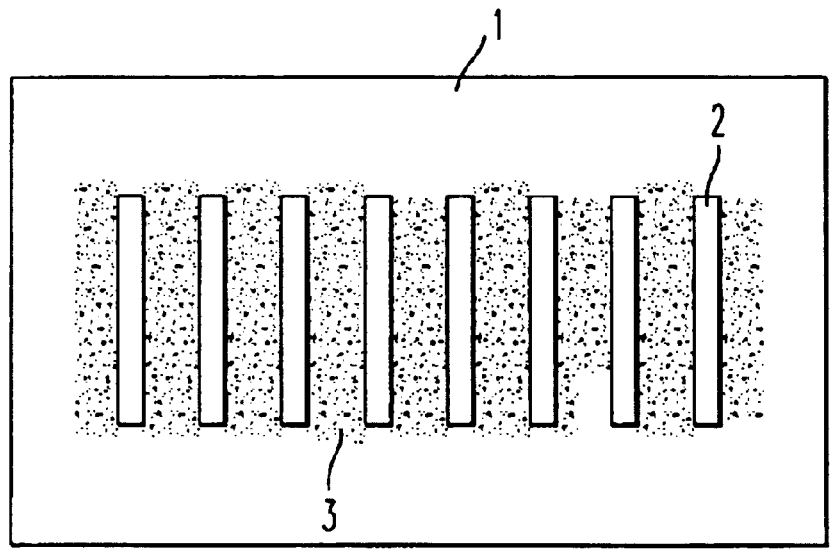
FIG. 1(a) is a view showing the +z surface of a conventional LN crystal substrate having a congruent composition after formation of periodic polarization inversion, as observed by a transmission polarization microscope.

The present inventors have found that the problems in the device performance or in the polarization inversion control characteristic of an optically functional device utilizing polarization-inverted structures of a ferroelectric single crystal, are attributable to the single crystal substrate. The present invention is based on a discovery that a single crystal substrate of a LN crystal having a certain specific composition is useful for optically functional devices utilizing polarization-inverted structures of a ferroelectric single crystal. Namely, as is different from the characteristics of conventional materials, the lithium niobate single crystal having a molar ratio of Li/Nb within a range of from 0.95 to 1.01, is capable of substantially improving the quality of a polarization-inverted device material.

It has been found that by using such a lithium niobate single crystal, the characteristics of the optically functional devices can be remarkably improved.

The polarization inversion characteristics found by the present invention are also ones attributable to the effect specific to the LN single crystal having such a molar fraction. The LN single crystal close to the stoichiometric composition is a crystal, from which it has become possible to prepare an optically homogeneous substrate only recently by a double crucible method wherein the material is continuously supplied, and its optical characteristics have not yet been fully clarified. Especially, the optical characteristics of the polarization-inverted boundaries of such a crystal have been made clear for the first time by the present inventors. Substantial improvement of the characteristics of an optically functional device utilizing such optical characteristics, has still been in a field yet to be explored.

Now, a process for production and physical properties of the LN single crystal to be used for the optically functional device of the present invention, will be described. Starting material powders of commercially available high purity $Li_2O$ and $Nb_2O_5$ were prepared. To obtain a material for the Li component excessive composition, they were mixed in a ratio of $Li_2O:Nb_2O_5$ being from 0.54:0.46 to 0.60:0.40, and to obtain a material for the stoichiometric composition, they were mixed in a ratio of $Li_2O:Nb_2O_5$ being 0.50:0.50. Then, the respective materials were subjected to rubber press molding under a hydrostatic pressure of 1 ton/cm$^2$, followed by sintering at a temperature of about 1,050° C. in atmospheric air to obtain starting material rods. Further, as a powder material for continuous supply, the material for the stoichiometric composition which was already mixed, was sintered at a temperature of about 1,150° C. in atmospheric air, pulverized and classified to a size within a range of from 50 μm to 500 μm.

Then, in order to grow a single crystal by the double crucible method, the starting material rods prepared from the Li component excessive material were preliminarily filled into the inner and outer crucibles, and then the crucibles were heated to prepare a Li component excessive melt. In a test to confirm the effect of addition of Mg, at the time of filling, commercially available high purity $MgCO_3$ was preliminarily filled in the inner and outer crucibles in an amount within a range of from 0.1 to 4.8 mol %.

Then, employing the double crucible method for continuous supply of the material, growing of a LN single crystal close to the stoichiometric composition, was carried out. A seed crystal was dipped in the melt of the Li component excessive composition in the double crucible and pulled up to obtain a single crystal close to the stoichiometric composition i.e. having the non-stoichiometric defect concentration suppressed as far as possible. To precisely control the density and structure of the non-stoichiometric defect, the crystal was grown while automatically supplying to the outer crucible the material having the stoichiometric composition having a molar fraction of $Li_2O/(Nb_2O_5+Li_2O)$ of 0.50 in an amount corresponding to the crystallized growth amount.

Here, the crucibles used for growing were made of platinum, and the outer crucible had a diameter of 125 mm and a height of 70 mm, and the inner crucible had a diameter of 85 mm and a height of 90 mm. Also in this case, in order to homogenize the composition of the melt, the crucible was rotated at a rate of 3 rpm in a direction opposite to the seed crystal during the growing. As the growing conditions, the rotational speed of the crystal was 15 rpm, and the pulling up speed was constant at 0.5 mm/hr, and the atmosphere for the growing was atmospheric air. By the growing for about one week, a colorless transparent LN crystal having no cracks was obtained of a size with a diameter of about 49 to 52 mm and a length of about 65 to 75 mm.

With respect to each of the obtained crystals, samples were cut out from three portions, i.e. the upper portion, the center portion and the lower portion, of each crystal, and the respective Li/Nb molar ratios were obtained by a chemical analysis. In the chemical analysis, the composition was very carefully analyzed in order to accurately obtain the absolute values of the compositional ratios. The analysis was carried out by using different analytical instruments for the same sample, and the average value of the results was taken. As a result, in the case of the LN single crystals, with the composition closest to the stoichiometric composition, the Li/Nb molar ratio was from 0.99 to 1.01.

On the other hand, in the crystal having Mg added, Mg is substituted at Li and Nb sites, and as the amount of Mg increases, the Li/Nb molar ratio changes, and the Li/Nb molar ratio of the obtained crystals was within a range of more than 0.95 and less than 1.0. In a case where at least one element selected from Zn, Sc and In is added other than Mg, the content in the crystal relative to the added amount varies, as the segregation coefficient within the crystal varies depending upon the type of the element, but in the case of any added element, the added element will be substituted at Li and Nb sites, and as the amount of the added element increases, the Li/Nb molar ratio changes, and the Li/Nb molar ratio of the obtained crystals was within a range of more than 0.95 and less than 1.0.

On the other hand, in the evaluation of the compositions by measuring their Curie temperature, it was preliminarily confirmed that the Curie temperature of the standard sintered sample of the stoichiometric composition prepared by sintering a mixture formulated to have stoichiometric composition at 1150° C., was 1200° C., and then, the Curie temperatures of LN single crystals grown by the above-mentioned double crucible for continuously supplying the material, were compared with this value. The results of evaluation of the Li/Nb molar ratios by measuring the Curie temperatures substantially agreed to the results of the chemical analysis. Further, it was confirmed that the homogeneity of crystal composition in one crystal was excellent.

Then, from the single domained LN single crystal, a block sample having a size of 35 mm×35 mm×40 mm was cut out and subjected to surface polishing by mechanochemical polishing. The optical homogeneity of the sample was evaluated by Mach-zehnder interference method, whereby macro defects or optically non-uniform portions were not observed, and the change in the refractive index within the sample was not higher than $1\times10^{-5}$. Thus, it was confirmed that the sample was excellent in the optical homogeneity.

The substrate of a LN single crystal having a congruent composition which has been commercially available, is one wherein the Nb component is substantially excessive from the restriction of the technology for growing a single crystal. As the Li/Nb molar ratio is 0.94, a large amount of non-stoichiometric defects are contained as much as a few percent. On the other hand, the present inventors have found for the first time that it is possible to grow a LN single crystal having a Li/Nb molar ratio of from 0.95 to 1.01 closer to the stoichiometric composition by growing a crystal from a melt containing the Li component excessively, by a double crucible method wherein the material is continuously supplied, and the single crystal having the concentration of non-stoichiometric defects due to an excessive Nb component reduced, shows excellent characteristics as a substrate for an optically functional device.

Namely, it has been found that the large amount of non-stoichiometric defects formed by excessive Nb in a conventional crystal will create a serious problem to an optically functional device utilizing the polarization-inverted structures. By the presence of such defects, the hysteresis curve showing the relation between the spontaneous polarization and the applied voltage required for the polarization inversion, becomes asymmetric, and a high voltage of a few tens kV/mm will be required for the polarization inversion, and yet it has been found that if polarization inversion is carried out, large optical distortions and propagation losses will be introduced to the polarization-inverted boundaries. Further, it has been found that there are many non-stoichiometric defects, and such defects are non-uniformly distributed within the crystal, and at a portion where the defect concentration is high, polarization inversion is likely to be pinning, whereby a larger distortion tends to be built up, thus leading to breakage of the crystal.

Figure 1B:
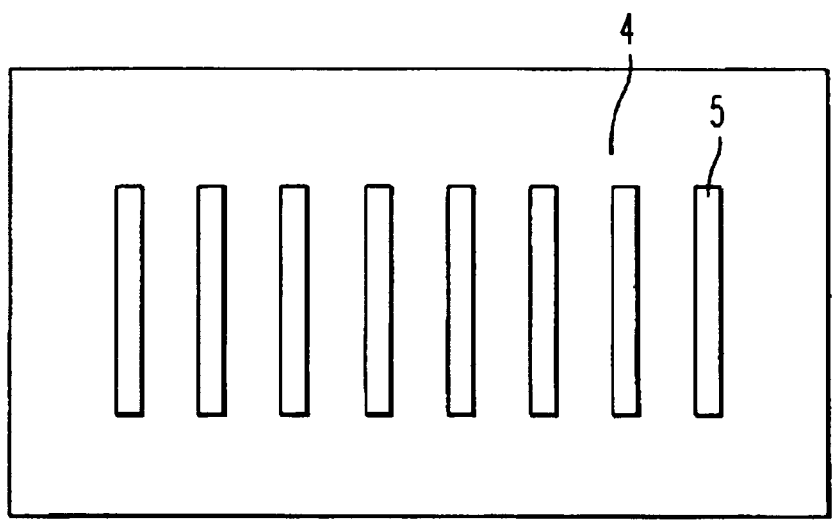
FIG. 1(b) is a view showing the +z surface of a LN crystal substrate close to the stoichiometric composition after forming periodic polarization inversion, as observed by a transmission polarization microscope.

FIG. 1 shows examples in which a LN single crystal was used as a substrate, periodic polarization-inverted structures were formed by an electric field application method on a substrate having a thickness of 0.5 mm and having both sides optically polished, and then, the polarization-inverted portions were inspected in detail by a polarization microscope. The periodic cycle of the polarization inversion was about 3 to 4 $\mu$m and was designed for quasi-phase matching depending upon the wavelength of the fundamental wave in the vicinity of a wavelength of 850 nm.

FIG. 1($a$) is a view when a conventional LN single crystal having a congruent composition was used for the substrate 1. FIG. 1($b$) is a view when a LN single crystal having a composition close to the above-mentioned stoichiometric composition, was used for the substrate 4. The difference between the two is apparent. Namely, in FIG. 1($a$), it was observed that very large optical distortions 3 were present in the periodic polarization-inverted portions 2, whereas in FIG. 1($b$), under a polarization microscope, light passed uniformly, and no distortion was observed at the periodic polarization-inverted portions 5.

Further, polarization inversions having various shapes and sizes were formed in the crystal substrates, and the distortions at the polarization-inverted boundaries depending on the differences of the substrates, were observed, and the refractive indices at the polarization-inverted boundaries were evaluated by a laser interference method, whereby with the conventional crystal, a very large change in the refractive index from $8\times10^{-3}$ to $3\times10^{-4}$, was observed. Whereas, it was confirmed that with the optically functional device employing the crystal substrate of the present invention, it was possible to obtain an optical distortion of not higher than $1\times10^{-4}$ even when no thermal treatment was carried out.

Figure 2:
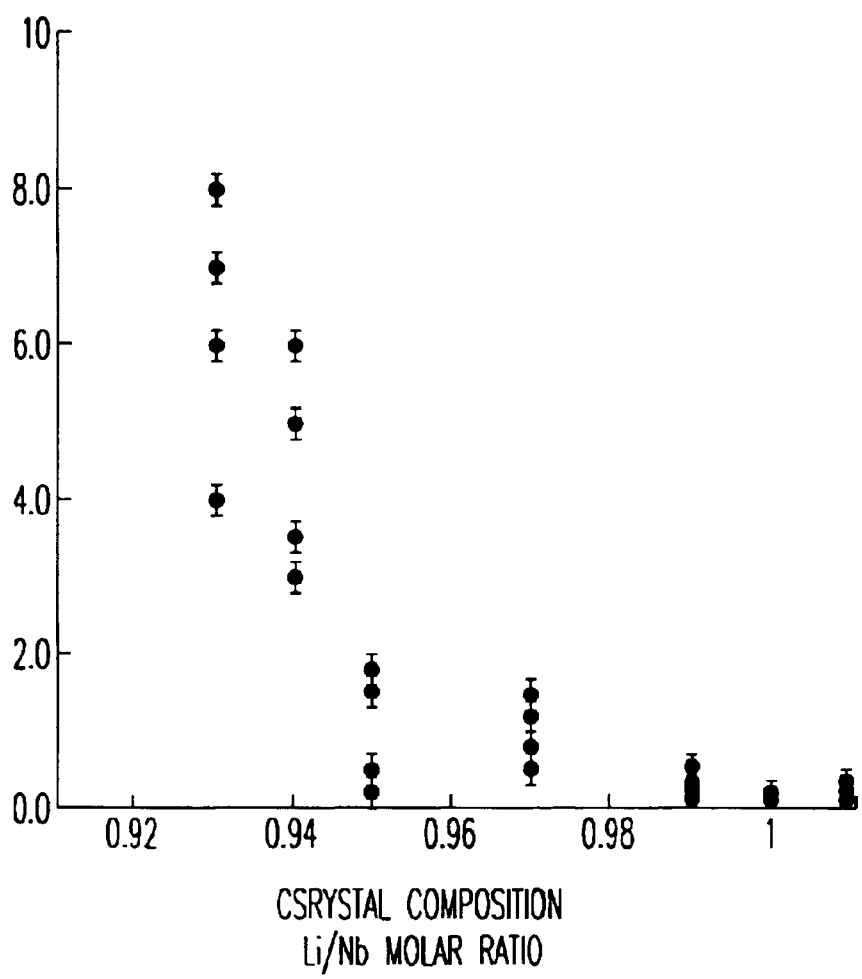
FIG. 2 is a graph showing the relation between the crystal composition and the propagation loss within the crystal as light propagates through polarization-inverted portions.

Further, FIG. 2 is a graph showing the results of evaluation of the degrees of the propagation losses caused by distortions or scattering in the crystal, of light propagating through the polarization-inverted portions, with respect to LN single crystals having various compositions and having a length of 5 mm and a thickness of 0.5 mm, with both side surfaces mirror polished, having periodic polarization-inverted structures formed by an electron beam irradiation method and a voltage application method at a temperature from room temperature to 200° C.

Even among samples having the same composition, variation was observed in the propagation loss depending upon the applied voltage for the preparation of the polarization inversion, the shape of the electrode, the material of the electrode, the temperature, etc. It was found that a crystal having a congruent composition having a Li/Nb molar ratio of 0.94, the propagation loss was very large at a level of from 4 to 8%. Whereas, with many crystals such as a LN single crystal with no additive close to the stoichiometric composition, having a Li/Nb molar ratio of 0.95 to 1.01, and a LN single crystal containing about 3 mol % of MgO and having a Li/Nb molar ratio of 0.95, the propagation loss was not more than 2%, and among them, there was a polarization-inverted crystal of good quality having a propagation loss of not more than 0.1%.

Figure 3:
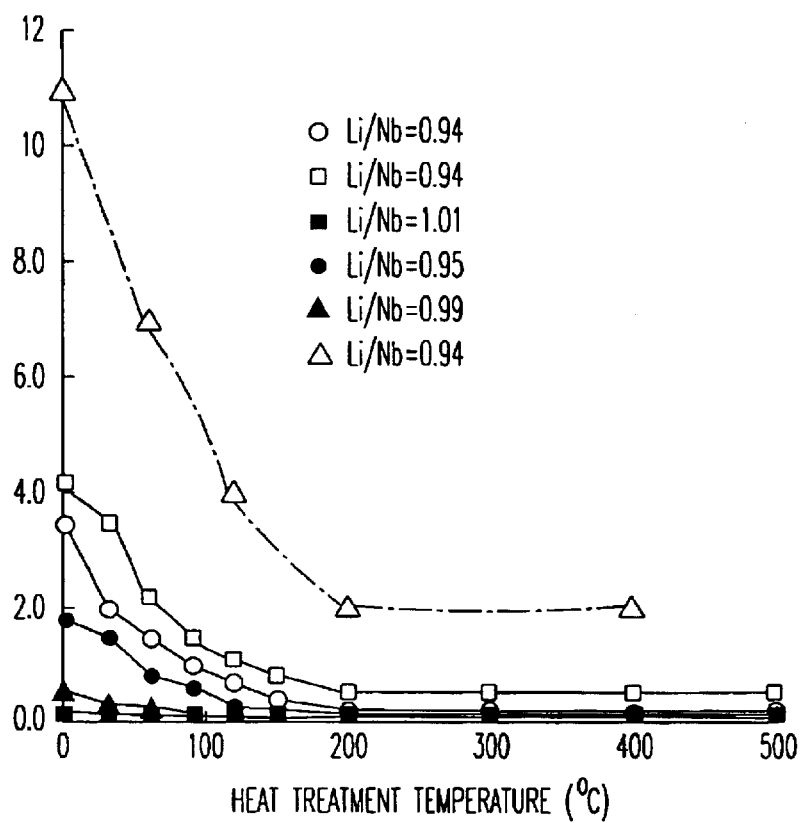
FIG. 3 is a graph showing the relation between the heat treatment temperature and the propagation loss within the crystal as light is passed through polarization-inverted portions.

Further, FIG. 3 is a graph showing how much the propagation loss of light passed through the polarization-inverted portions of a crystal having a length of 5 mm and a thickness of 0.5 mm and having periodic polarization-inverted structures formed by an electron beam irradiation method and a voltage application method at a temperature around room temperature, can be reduced by heat treatment. If a conventional crystal having a congruent composition is used, after the polarization inversion treatment, the loss tends to be very large due to e.g. an optical distortion or scattering. And, it has been found that with a congruent LN crystal, the loss can not be reduced unless the substrate is heated at a high temperature. Whereas, in the case where a LN single crystal close to the stoichiometric composition of the present invention is employed as the substrate, the loss is small even without carrying out heat treatment, and it is evident that improvement of the performance of the optically functional device can be expected.

In a LN single crystal, in a paraelectric phase at a temperature higher than the Curie temperature, Li and Nb ions are positioned at electrically neutral positions, but in a ferroelectric phase at a temperature of not higher than the Curie temperature, Li and Nb ions will be slightly displaced towards the +z or −z direction. Depending upon the direction of this displacement of ions, the positive or negative polarization direction of the domain will be determined. With an optically functional device having polarization-inverted structures, it becomes necessary to forcibly move such ions at a low temperature by applying a high electric field.

In the case of a congruent composition having many non-stoichiometric defects, it is not easy to move excess Nb entered into Li sites, whereby a high applied voltage will be required for the polarization inversion. Further, since the polarization is forcibly inverted by application of a high voltage, it is considered that a large optical distortions will be introduced to the polarization-inverted boundary. At present, the reasons for the reduction of the optical distortions or propagation losses as observed with the optically functional device of the present invention, can not fully be explained only with the degrees of the internal electric field and the voltage for inversion of the crystal.

However, it is evident that the LN single crystal close to the stoichiometric composition, which has small optical distortions or losses and having non-stoichiometric defects reduced by at least one digit over the conventional crystal having a congruent composition containing a large amount of non-stoichiometric defects, is superior as a substrate for a polarization-inverted device. Accordingly, by employing the LN single crystal having a composition close to the stoichiometric composition as a ferroelectric single crystal substrate, it is possible to obtain a change in the refractive index at the polarization-inverted boundaries of not higher than $1 \times 10^{-4}$ without a heating step to remove optical distortions at the polarization-inverted boundaries and without optical distortions at the polarization-inverted boundaries even when polarization inversion is formed, whereby the obtained device will have excellent characteristics as an optically functional device which is excellent in the controllability of the polarization-inverted structures and which is free from scattering of a laser beam and has a small propagation loss.

Now, the present invention will be described in further detail with reference to Examples. However, it should be understood that the present invention is by no means restricted to such specific Examples.

EXAMPLE 1

Figure 4:
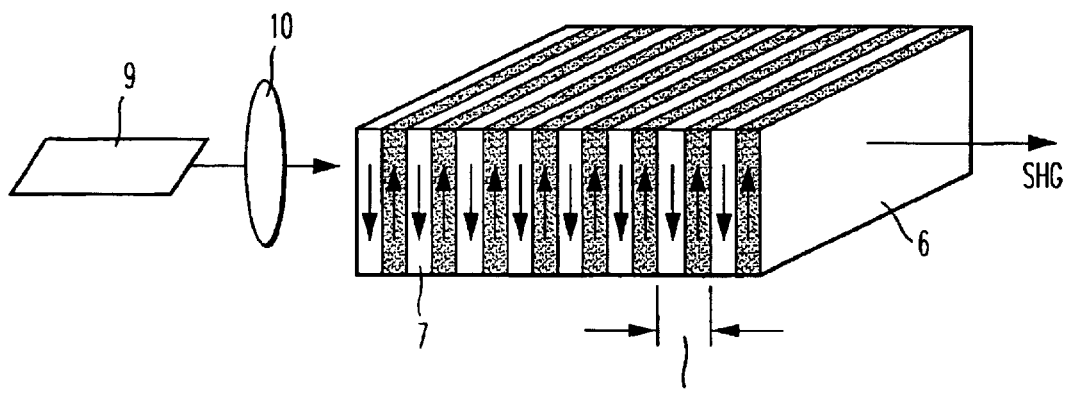
FIG. 4 is a schematic view illustrating a light frequency conversion device as one embodiment of the present invention.

The characteristics when a LN single crystal was applied to a light frequency conversion device, will be described. FIG. 4 is a schematic view illustrating a QPM device having periodically polarization-inverted structures formed on a substrate 6 to have the polarization-inverted regions 7 with a periodical polarization-inversion width 8 by using as the substrate 6 a single crystal close to the stoichiometric composition (a LN single crystal with no additive, having a Li/Nb molar ratio of from 0.98 to 1.01). On the +z surface of the substrate 6 having a thickness of 0.30 mm to 3.0 mm and having both sides optically polished, a comb electrode and a parallel electrode were formed by patterning. It was so designed that the periodic cycle was about 3.2 $\mu$m, and quasi-phase-matching was established to the fundamental wave having a wavelength of about 850 nm. On the −z surface of the crystal substrate having the above composition, an electrode was vapor-deposited over the entire area. Across the comb electrode and the parallel electrode and across the comb electrode and the rear side electrode on the −z surface, a low electric field of from about 3 to 4 kV/mm, which is lower by about ⅕ than for the conventional congruent crystal, was applied to form periodically polarization-inverted regions 2 without dielectric break down.

In this Example, the polarization-inverted portions of the periodically polarization-inverted structures were observed in detail by a polarization microscope, whereby no optical distortions were observed. Further, to the polarization-inverted portions, a laser beam was passed, whereby no scattering of the laser beam was observed. Accordingly, no heat treatment was required, and yet frequency conversion with high efficiency was obtained. With the LN crystal employed, the polarization state was preliminarily very well homogenized. The LN single crystal close to the stoichiometric composition is excellent in the uniformity of the crystal, and when the periodic polarization inversion is to be formed in the crystal, it becomes possible to form uniform polarization-inverted structures.

Thus, the problems as observed when the conventional LN crystal having a congruent composition was used as a substrate, were solved. Further, after forming the polarization-inverted structures, the crystal was taken out, and the y surface of the crystal as the cross sectional surface was polished and subjected to etching with a mixed liquid of hydrofluoric acid and nitric acid, whereupon the state of inversion of polarization was examined. It was confirmed that with respect to the periodic polarization inversion width ratio and the polarization shape, by optimizing the pulse width of the applied voltage and the current, it was possible to bring the polarization inversion width ratio of the periodic polarization to an ideal ratio over the entire sample with high precision.

Likewise, also with respect to a sample having a thickness of 1 mm or more, it was possible to form the periodic polarization-inverted structures with high precision. Yet, no optical distortions were observed, and the propagation loss was very small at a level of not more than 0.2%. With such a thick sample, it was a substantial merit that no heat treatment was required after the polarization inversion. Namely, a sample having a thickness of 1 mm or more has had a problem that if there is a partial macro defect of the crystal, non-uniformity of the electrode or thermal non-uniformity, the polarization-inverted boundaries are likely to move during the heat treatment to remove optical distortions, or the crystal is likely to be broken by a pyroelectric effect.

Accordingly, it is considered that the optically functional device prepared in this Example, which is excellent in the optical uniformity and the polarization inversion controllability, is most suitable as a frequency conversion device of an internal resonator type which is required to have a particularly small propagation loss.

Figure 5:
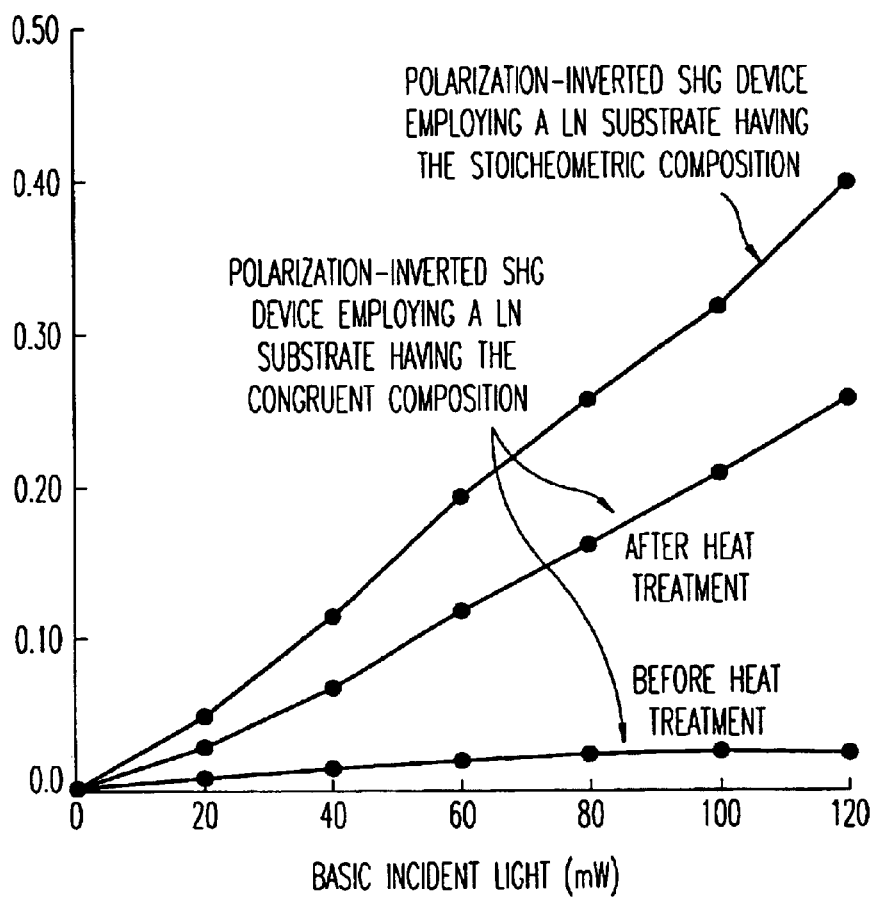
FIG. 5 is a graph showing the relation between the basic incident light and the SHG light output.

Evaluation of the characteristics of a QPM-SHG device was carried out by using a wavelength-changeable high power Ti sapphire laser (wavelength: 850 nm) as the fundamental wave, and light frequency conversion with high efficiency was confirmed. The results are shown in FIG. 5. When the conventional LN crystal having a congruent composition was used as the substrate, no substantial efficient frequency conversion was obtained before the heat treatment. Some improvement in the conversion efficiency was observed by the heat treatment, but with the optically functional device of the present invention, higher conversion efficiency was obtained.

The small propagation loss is believed to be the reason for the high conversion efficiency. Further, the non-linear optical constant of the substrate being large, no optical distortion being present, and the completeness of polarization-inverted structures being high without necessity of heat treatment, are considered to be contributing to the high performance of the optically functional device.

Here, an Example has been described wherein a QPM-SHG device for generating blue color light against the fundamental wave of a near infrared light in the vicinity of 850 nm, was prepared. However, according to the present invention, the fundamental wave is not limited to such two wavelengths, and the present invention is applicable to a wavelength range wherein the LN single crystal is transparent and phase-matching is possible.

Further, the optically functional device of the present invention wherein the polarization structure of a LN single crystal is periodically inverted and the wavelength of an incident laser having a visual to near infrared wavelength is shifted to a shorter or longer wavelength, is applicable not only to the second harmonic wave generating device, but also to an optical parametric oscillator device, a different frequency or sum frequency generating device, or a high performance optical device utilizing the polarization-inverted structures, such as an optical switch or an optical modulator. It is applicable also to an application field such as remote sensing or gas detection, or to an optical communication field including a wavelength mixer or a pulse forming device.

Here, as an Example of forming the polarization-inverted structures at portions of a ferroelectric single crystal substrate at a temperature of not higher than the Curie temperature, an optically functional device of a LN single crystal employing a voltage application method has been described. However, the same effects can be obtained if an electron beam scanning irradiation method is used as the method of forming the polarization-inverted structures at a temperature of not higher than the Curie temperature.

EXAMPLE 2

Using a substrate close to the stoichiometric composition (a LN single crystal having a Li/Nb molar ratio of from 0.98 to 1.01 and containing no additive), polarization-inverted structures of a lens or prism shape were formed, and a polarizing device utilizing the electro-optical effect, or an optical device such as a cylindrical lens, a beam scanner or a switch, was prepared.

Figure 6:
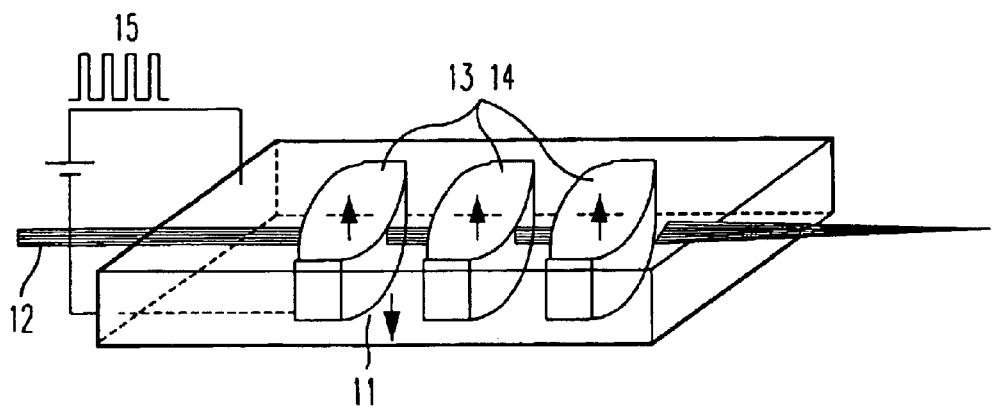
FIG. 6 is a schematic view illustrating a condensing device as another embodiment of the present invention.
Figure 7:
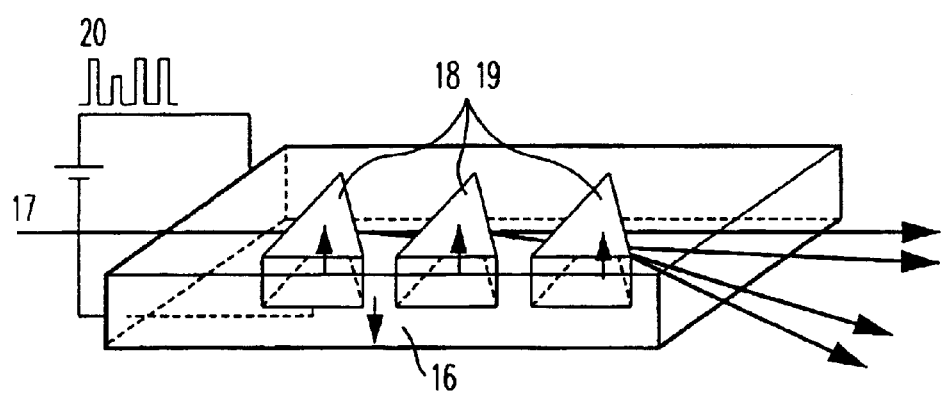
FIG. 7 is a schematic view illustrating a polarizing device as still another embodiment of the present invention.

FIGS. 6 and 7 are schematic views of optically functional devices for carrying out focusing and scanning to control laser beams from semiconductor lasers 12 and 17 introduced into single crystals, by utilizing the electro-optical effects formed by polarization-inverted portions 13 and 18 of lens 14 and prism 19 shapes, respectively. The above-mentioned LN single crystal with z-cut having both sides polished and having a diameter of 1.5 inch and a thickness of from 0.2 to 2.0 mm, was prepared, and an Al electrode having a thickness of about 200 mm was formed on both z-surfaces by spattering, and lens or prism patterns were formed by means of a lithograph. Then, on the +z-surface, a pulsed voltage 15 or 20 of from about 2.5 to 5 kV/mm was applied to invert the polarization.

In this Example, the polarization-inverted portions were observed in detail by a polarization microscope, whereby no optical distortions were observed. Further, a laser beam was passed through the polarization-inverted portions, whereby no scattering of the laser beam was observed. Accordingly, no heat treatment was required, and yet optically functional devices were obtained. The polarization state of the LN crystal employed was preliminarily very homogenized. Further, the end surfaces of the crystal were mirror-polished and used as input and output surfaces for the laser beam.

The performance of the optical device utilizing the electro-optical effect of the LN single crystal having inversion of the refractive index formed by the polarization-inverted structures, was determined by the design of the polarization-inverted structures of a lens or prism shape, the precision of the process for preparing the polarization-inverted structures and the degree of the electro-optical constant of the material. With respect to the polarization-inverted structures of a lens or prism pattern in this Example, it is noteworthy that there were no propagation losses or optical distortions at the polarization-inverted boundaries, and it was very easy to control the polarization inversion, whereby good device characteristics were obtained.

With a conventional LN crystal having a congruent composition, if the inversion periodical cycle becomes short or the inverted structures become complex, it is difficult to prepare polarization-inverted structures of a lens or prism shape with high precision, and heat treatment used to be required. Whereas, according to the present invention, a LN single crystal close to the stoichiometric composition is employed for application to an optically functional device utilizing the polarization-inverted structures, whereby it is possible to form polarization inversion with high precision for the optically functional device.

Further, this crystal has a larger electro-optical constant $r_{33}$ than the crystal having a congruent composition, whereby a better device performance was obtained with a smaller operation voltage. For example, in the case of a polarizing device, an angle of polarization as large as about 6° was obtained with a voltage of about 600 V/mm. Further, a lens operable in the vicinity of 100 V/mm was obtained, and switching operation at about 500 V/mm was accomplished.

Here, as an Example wherein polarization-inverted structures are formed at portions of a ferroelectric single crystal substrate at a temperature of not higher than the Curie temperature, an optically functional device of a LN single crystal employing a voltage application method, has been described. However, the same effects can be obtained, when an electron beam scanning irradiation method is used as the method of forming the polarization-inverted structures at a temperature of not higher than the Curie temperature.

As described in detail in the foregoing, the present invention provides an optically functional device comprising a ferroelectric single crystal substrate and polarization-inverted structures formed at portions of the substrate at a temperature of not higher than the Curie temperature by an electron beam scanning irradiation method or a voltage application method and designed to control light passed through the polarization-inverted portions, wherein a LN single crystal of a composition close to the stoichiometric composition having a molar ratio of Li/Nb within a range of from 0.95 to 1.01, is used as the ferroelectric single crystal, whereby a propagation loss of not higher than 2% can be obtained, and a change in the refractive index of the polarization-inverted boundaries of not more than $1 \times 10^{-4}$ can be obtained without a heating step to remove optical distortions at the polarization-inverted boundaries due to the directional inversion of spontaneous polarization. Accordingly, a device free from distortions at the domain boundaries and excellent in the optical homogeneity and the polarization inversion controllability, can be realized, and substantial improvement of the characteristics of optically functional devices can be expected.

Thus, the present invention will bring about significant effects to accelerate practical application of optically functional devices in various fields of e.g. optical information processing, optical processing technology, optical communication technology and optical measurement using a laser beam.

The entire disclosure of Japanese Patent Application No. 2000-255253 filed on Aug. 25, 2000 including specification, claims, drawings and summary are incorporated herein by reference in its entirety.

What is claimed is:

1. An optically functional device comprising a ferroelectric single crystal substrate and polarization-inverted structures formed at portions of the substrate at a temperature of not higher than the Curie temperature by an electron beam scanning irradiation method or a voltage application method and designed to control light passed through the polarization-inverted portions, wherein a $LiNbO_3$ crystal having a molar ratio of Li/Nb within a range of from 0.95 to 1.01, is used as the substrate, so that the propagation loss of light passed through the polarization-inverted portions immediately after formation of the polarization-inverted structures, is not more than 2%, wherein the ferroelectric single crystal substrate is made of a $LiNbO_3$ crystal having a molar ratio of Li/Nb within a range of from 0.95 to 1.00 and containing from 0.1 to 4.8 mol % of at least one element selected from the group consisting of Mg, Zn, Sc and In, as doped.

2. An optically functional device comprising a ferroelectric single crystal substrate and polarization-inverted structures formed at portions of the substrate at a temperature of not higher than the Curie temperature by an electron beam scanning irradiation method or a voltage application method and designed to control light passed through the polarization-inverted portions, wherein a $LiNbO_3$ crystal having a molar ratio of Li/Nb within a range of from 0.95 to 1.01, is used as the substrate, so that the change in the refractive index of the polarization-inverted boundaries is not more than $1\times10^{-4}$ without a heating step to remove an optical distortion at the polarization-inverted boundaries due to the directional inversion of spontaneous polarization in the ferroelectric crystal, wherein the ferroelectric single crystal substrate is made of a $LiNbO_3$ crystal having a molar ratio of Li/Nb within a range of from 0.95 to 1.00 and containing from 0.1 to 4.8 mol % of at least one element selected from the group consisting of Mg, Zn, Sc and In, as doped.

3. A method for improving the driving efficiency of an optically functional device, wherein a $LiNbO_3$ crystal having a molar ratio of Li/Nb within a range of from 0.95 to 1.01, is used as a substrate for the optically functional device to control polarization or condensing of a laser beam entered into a single crystal having polarization structures inverted in a prism or lens shape by means of an electro-optical effect.

4. The method of claim 3, wherein the $LiNbO_3$ crystal has a molar ratio of Li/Nb within a range of from 0.95 to 1.00 and contains from 0.1 to 4.8 mol % of at least one element selected from the group consisting of Mg, Zn, Sc and In, as doped.

5. A method for improving the frequency conversion efficiency of an optically functional device, wherein a $LiNbO_3$ crystal having a molar ratio of Li/Nb within a range of from 0.95 to 1.01, is used as a substrate for the optically functional device to carry out the frequency conversion of a laser entered into a single crystal having periodically inverted polarization structures by means of a nonlinear optical effect, wherein the $LiNbO_3$ crystal has a molar ratio of Li/Nb within a range of from 0.95 to 1.00 and contains from 0.to 4.8 mol % of at least one element selected from the group consisting of Mg, Zn, Sc and In, as doped.

* * * * *